US012664273B2

(12) United States Patent
Seletskiy et al.

(10) Patent No.: US 12,664,273 B2
(45) Date of Patent: Jun. 23, 2026

(54) SYSTEMS AND METHODS FOR REMOVING MALICIOUS CODE FROM A SCRIPT WITHOUT COMPROMISING SCRIPT FUNCTIONALITY

(71) Applicant: Cloud Linux Software Inc., Estero, FL (US)

(72) Inventors: Igor Seletskiy, Palo Alto, CA (US); Roman Gavrilchenko, Moscow (RU)

(73) Assignee: Cloud Linux Software Inc., Estero, FL (US)

( * ) Notice: Subject to any disclaimer, the term of this patent is extended or adjusted under 35 U.S.C. 154(b) by 63 days.

(21) Appl. No.: 18/815,923

(22) Filed: Aug. 27, 2024

(65) Prior Publication Data

US 2026/0064839 A1     Mar. 5, 2026

(51) Int. Cl.
*G06F 21/56* (2013.01)

(52) U.S. Cl.
CPC ........ *G06F 21/56* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 8,438,551 B2* | 5/2013 | Tonkin | ...................... | G06F 8/42 |
| | | | | 717/137 |
| 9,686,304 B1* | 6/2017 | Guo | .................... | H04L 63/1441 |
| 11,574,053 B1* | 2/2023 | Chen | ...................... | G06F 21/564 |
| 2005/0114771 A1* | 5/2005 | Piehler | .................... | G06F 40/10 |
| | | | | 715/264 |
| 2020/0311266 A1* | 10/2020 | Jas | .......................... | G06F 8/427 |

* cited by examiner

*Primary Examiner* — Christopher C Harris
(74) *Attorney, Agent, or Firm* — ArentFox Schiff LLP; Michael Fainberg

(57) ABSTRACT

Disclosed herein are systems and method for removing malicious code from a script without compromising script functionality. In one aspect, the method includes: identifying, in a script, at least one string corresponding to a malicious pattern; generating an abstract syntax tree (AST) of the script; identifying, in the AST, a parent operator associated with the at least one string; determining an absolute position and length of a node representing the parent operator in the AST; and removing malicious code from the script based on the absolute position and length of the node.

19 Claims, 5 Drawing Sheets

100

Script 104

Malicious Code 105

Software Remediation Module 102

AST Generation Component 106

Node Selection Component 108

Scanning Component 110

Remediation Component 112

Definitions Database 114

Figure 1:
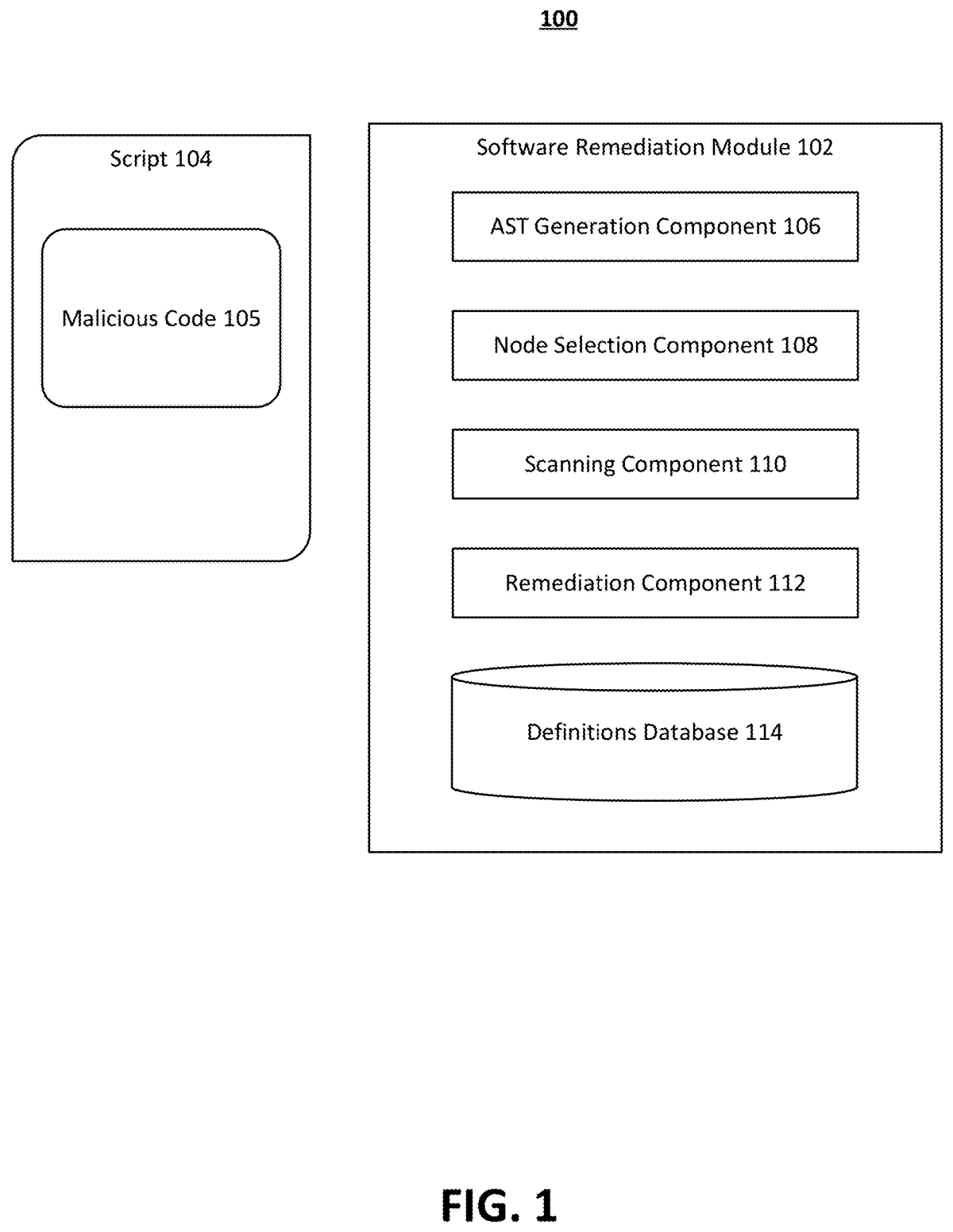

100

Script 104

Malicious Code 105

Software Remediation Module 102

AST Generation Component 106

Node Selection Component 108

Scanning Component 110

Remediation Component 112

Definitions Database 114

```
00000000:  61 20 3D 20-22 74 68 69-73 20 69 73-20 63 6C 65   a = "this is cle
00000010:  61 6E 20 63-6F 64 65 31-22 3B 0D 0A-62 20 3D 20   an code1";.b =
00000020:  22 65 76 69-6C 31 22 3B-20 2F 2F 65-76 69 6C 20   "evil1"; //evil
00000030:  63 6F 6D 6D-65 6E 74 0D-0A 69 66 20-28 62 29 20   comment.if (b)
00000040:  7B 0D 0A 20-20 20 20 2F-2F 65 76 69-6C 20 63 6F   {      //evil co
00000050:  6D 6D 65 6E-74 0D 0A 20-20 20 20 65-76 61 6C 28   mment      eval(
00000060:  22 65 76 69-6C 32 22 20-2B 20 2F 2A-65 76 69 6C   "evil2" + /*evil
00000070:  20 63 6F 6D-6D 65 6E 74-2A 2F 20 62-29 3B 0D 0A   comment*/ b);.
00000080:  20 20 20 20-2F 2F 65 76-69 6C 20 63-6F 6D 6D 65      //evil comme
00000090:  6E 74 0D 0A-7D 0D 0A 63-20 3D 20 66-28 22 74 68   nt.}.c = f("th
000000A0:  69 73 20 69-73 20 63 6C-65 61 6E 20-63 6F 64 65   is is clean code
000000B0:  32 22 29 3B-0D 0A                                 2");.
```

```
00000000:  61 20 3D 20-22 74 68 69-73 20 69 73-20 63 6C 65   a = "this is cle
00000010:  61 6E 20 63-6F 64 65 31-22 3B 0D 0A-62 20 3D 20   an code1";.b =
00000020:  22 65 76 69-6C 31 22 3B-20 2F 2F 65-76 69 6C 20   "evil1"; //evil
00000030:  63 6F 6D 6D-65 6E 74 0D-0A 69 66 20-28 62 29 20   comment.if (b)
00000040:  7B 0D 0A 20-20 20 20 2F-2F 65 76 69-6C 20 63 6F   {      //evil co
00000050:  6D 6D 65 6E-74 0D 0A 20-20 20 20 65-76 61 6C 28   mment      eval(
00000060:  22 65 76 69-6C 32 22 20-2B 20 2F 2A-65 76 69 6C   "evil2" + /*evil
00000070:  20 63 6F 6D-6D 65 6E 74-2A 2F 20 62-29 3B 0D 0A   comment*/ b);.
00000080:  20 20 20 20-2F 2F 65 76-69 6C 20 63-6F 6D 6D 65      //evil comme
00000090:  6E 74 0D 0A-7D 0D 0A 63-20 3D 20 66-28 22 74 68   nt.}.c = f("th
000000A0:  69 73 20 69-73 20 63 6C-65 61 6E 20-63 6F 64 65   is is clean code
000000B0:  32 22 29 3B-0D 0A                                 2");.
```

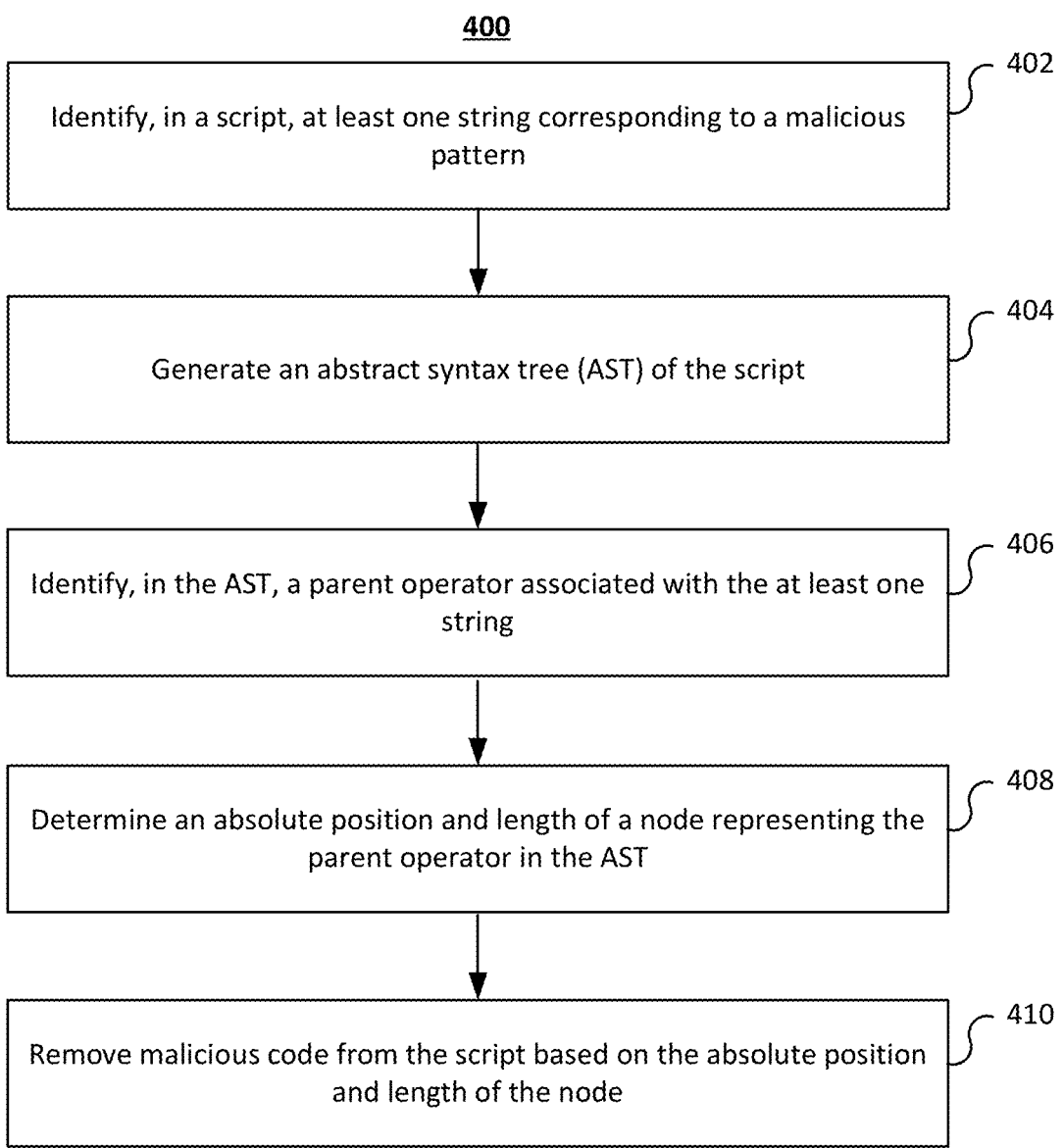

400

402

Identify, in a script, at least one string corresponding to a malicious pattern

404

Generate an abstract syntax tree (AST) of the script

406

Identify, in the AST, a parent operator associated with the at least one string

408

Determine an absolute position and length of a node representing the parent operator in the AST

410

Remove malicious code from the script based on the absolute position and length of the node

FIG. 4

SYSTEMS AND METHODS FOR REMOVING MALICIOUS CODE FROM A SCRIPT WITHOUT COMPROMISING SCRIPT FUNCTIONALITY

FIELD OF TECHNOLOGY

The present disclosure relates to the field of data security, and, more specifically, to systems and methods for removing malicious code from a script without compromising script functionality.

BACKGROUND

When PHP or JavaScript (JS) scripts are infected by malicious code, attackers typically ensure that the syntax of the script remains intact so that the script continues to function post-infection. This presents a significant challenge for antivirus programs, which must remove the malicious code while preserving the script's operational integrity.

Traditional methods for detecting infections in scripts often involve searching for specific patterns within the strings of the script. When a pattern indicative of malicious code is identified, the corresponding string can be removed to neutralize the threat. However, it is crucial that the removal of these strings does not disrupt script functionality.

The challenge lies in accurately identifying malicious patterns and effectively removing them without causing harm to the script. Conventional pattern-matching techniques can sometimes lead to false positives, where legitimate code is mistakenly identified as malicious, or false negatives, where actual malicious code is not detected.

To address these issues, advanced methods involving heuristic analysis and behavior-based detection have been developed. These techniques aim to improve the accuracy of malware detection in scripts by analyzing the behavior and structure of the code, rather than relying solely on pattern matching. Once malicious code is removed, the remaining script is automatically repaired if necessary to maintain its functionality. This often involves sophisticated code analysis and automated refactoring.

SUMMARY

The present disclosure introduces a novel approach that utilizes Abstract Syntax Trees (ASTs) for detecting and treating malicious code in scripts. An AST represents the structure of a program in an abstract form, capturing the hierarchical relationships between its elements.

By leveraging an AST, an antivirus program may precisely identify and safely remove the portions of the script that are considered malicious, based on the patterns detected. This method ensures that the structural integrity of the script is maintained, thereby preserving script functionality post-disinfection.

In one exemplary aspect, the techniques described herein relate to a method for removing malicious code from a script without compromising script functionality, the method including: identifying, in a script, at least one string corresponding to a malicious pattern; generating an abstract syntax tree (AST) of the script; identifying, in the AST, a parent operator associated with the at least one string; determining an absolute position and length of a node representing the parent operator in the AST; and removing malicious code from the script based on the absolute position and length of the node.

In some aspects, the techniques described herein relate to a method, wherein removing the at least one string from the script will generate a syntax error, and wherein removing code including the parent operator and the at least one string will not generate the syntax error.

In some aspects, the techniques described herein relate to a method, wherein the at least one string in the AST is a child node of the parent operator.

In some aspects, the techniques described herein relate to a method, removing comments in the script that are used to obfuscate code.

In some aspects, the techniques described herein relate to a method, wherein removing the malicious code from the script based on the absolute position and the length of the node includes: generating a modified AST by removing the node based on the absolute position and the length of the node; and reconstructing the script using the modified AST, wherein the reconstructed script does not include the malicious code.

In some aspects, the techniques described herein relate to a method, wherein the parent operator is a first parent operator, further including: identifying, in the AST, a second parent operator associated with the at least one string; determining another absolute position and length of another node representing the second parent operator in the AST; and removing additional malicious code from the script based on the another absolute position and length of the another node.

In some aspects, the techniques described herein relate to a method, wherein the absolute position is an amount of bytes from the beginning of a file and the length of the node represents an amount of bytes of source code associated with the node.

In some aspects, the techniques described herein relate to a method, wherein the parent operator includes at least one child operator, and wherein removing the malicious code includes removing code associated with the at least one child operator.

It should be noted that the methods described above may be implemented in a system comprising a hardware processor. Alternatively, the methods may be implemented using computer executable instructions of a non-transitory computer readable medium.

In some aspects, the techniques described herein relate to a system for removing malicious code from a script without compromising script functionality, including: at least one memory; at least one hardware processor coupled with the at least one memory and configured, individually or in combination, to: identify, in a script, at least one string corresponding to a malicious pattern; generate an abstract syntax tree (AST) of the script; identify, in the AST, a parent operator associated with the at least one string; determine an absolute position and length of a node representing the parent operator in the AST; and remove malicious code from the script based on the absolute position and length of the node.

In some aspects, the techniques described herein relate to a non-transitory computer readable medium storing thereon computer executable instructions for removing malicious code from a script without compromising script functionality, including instructions for: identifying, in a script, at least one string corresponding to a malicious pattern; generating an abstract syntax tree (AST) of the script; identifying, in the AST, a parent operator associated with the at least one string; determining an absolute position and length of a node representing the parent operator in the AST; and removing malicious code from the script based on the absolute position and length of the node.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 1 is a block diagram illustrating a system for removing malicious code from a script without compromising script functionality.

FIG. 2A depicts a hexadecimal mode view of an example script.

FIG. 2B depicts a view with a portion in the hexadecimal mode view highlighted.

FIG. 4 illustrates a flow diagram of a method for removing malicious code from a script without compromising script functionality.

DETAILED DESCRIPTION

Figure 3:
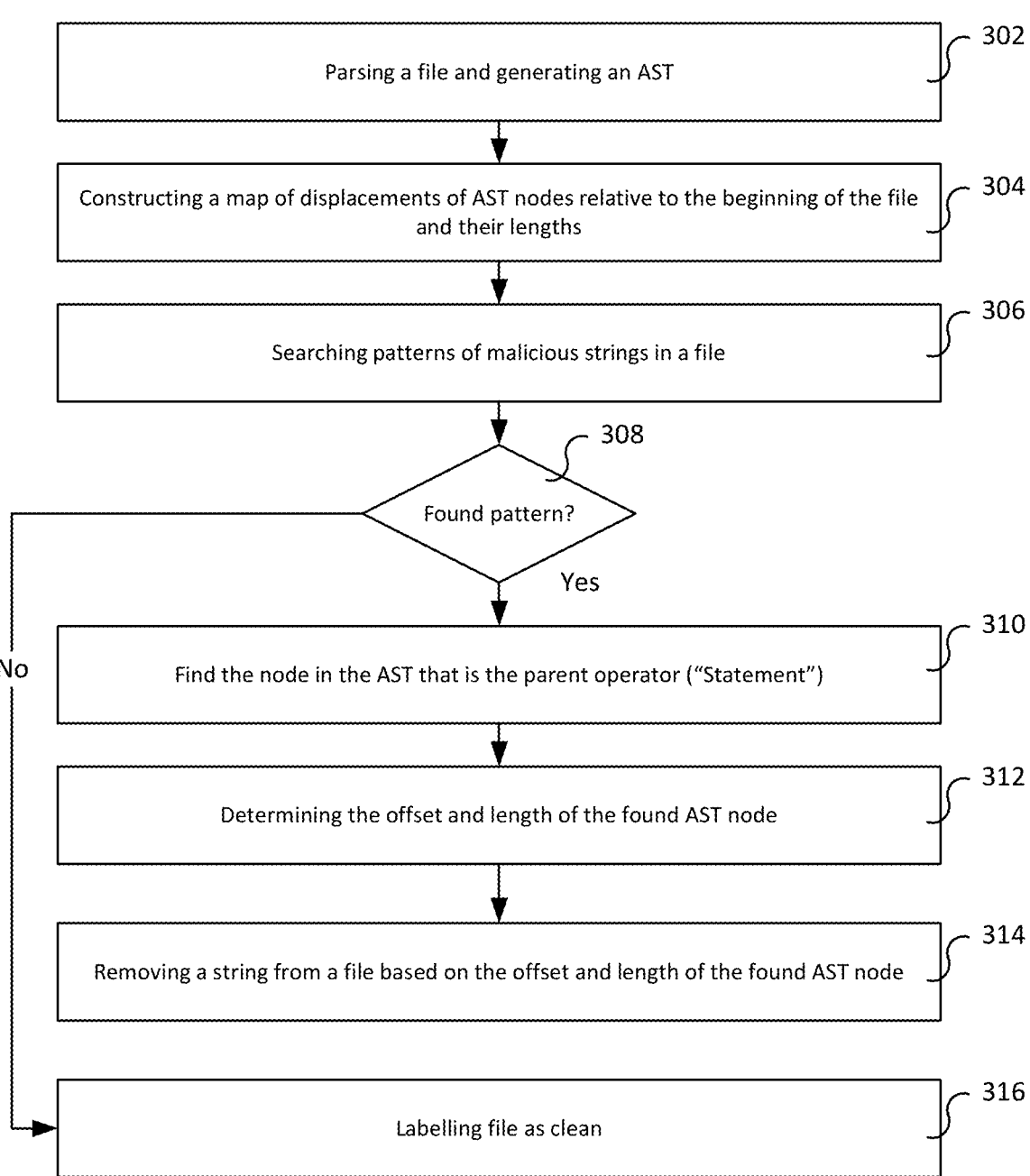
FIG. 3 illustrates a flow diagram of a method for removing a string matching a pattern from a file.

Exemplary aspects are described herein in the context of a system, method, and computer program product for removing malicious code from a script without compromising script functionality. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

FIG. 1 is a block diagram illustrating system 100 for removing malicious code from a script without compromising script functionality. The system 100 includes software remediation module 102, which may be executed by a computer system 20 (e.g., described in FIG. 5). For example, software remediation module 102 may be an anti-virus program running on a computing device such as a desktop computer.

In some aspects, certain features of software remediation module 102 may be stored/executed on a remote device such as a server in the cloud. For example, software remediation module 102 may be split into a thin client application installed on a user-end computing device and a thick client application installed on a remote computing device. The thick client application may perform the functionality of each of the components in software remediation module 102 and transmit the results to the thin client application for display on a user interface.

In an exemplary aspect, software remediation module 102 includes Abstract Syntax Tree (AST) generation component 106, node selection component 108, scanning component 110, remediation component 112, and definitions database 114. Using these components, software remediation module 102 is configured to scan script 104 and remove malicious code 105 within script 104 without causing script 104 to lose its functionality. It should be noted that software remediation module 102 is thus able to interact with any arbitrary infected script and revert it back to a safe script without needing access a backup of the script. System 100 is thus especially useful when a backup of the script is unavailable or would require substantively more processing resources to recover.

In an exemplary aspect, software remediation module 102 receives an input script. In some aspects, the script is provided by the user via a user interface of software remediation module 102 (e.g., the user commands an anti-virus program comprising software remediation module 102 to scan a particular script). In some aspects, the script is automatically detected and scanned (e.g., the anti-virus program is configured to scan any new file that is written to the user-end computing device).

The following example is of a script written in Type-Script:

```
a = "this is clean code1";
b = "evil1"; //evil comment
if (b) {
    //evil comment
    eval("evil2" + /*evil comment*/ b);
    //evil comment
}
c = f("this is clean code2");
```

FIG. 2A depicts a hexadecimal mode view 200 of this script. FIG. 2B depicts the view 250 with a portion highlighted. The portion highlighted is the string to be removed.

In some aspects, scanning component 110 may scan the script using virus/malware definitions from definitions database 114, and determine that the script is malicious. In particular, suppose that the patterns for the lines "eval" and "evil1" are identified as malicious by scanning component 110. For example, definitions database 114 may include a plurality of patterns that scanning component 110 compares against the code in the script.

In some aspects, scanning component 110 may use a machine learning algorithm to perform a classification of which of the plurality of patterns best fit the code in the script. Training a machine learning algorithm to detect malicious patterns in scripts may involve various systematic steps. First, a diverse dataset comprising both benign and malicious scripts is collected and meticulously labeled to denote their respective categories. The next step may involve feature extraction, where scripts are transformed into structured representations that capture lexical, syntactic, and statistical characteristics. These features may be tokenized keywords or code complexity metrics, and may form the foundation for model selection and training. Supervised learning models such as Support Vector Machines (SVMs), Random Forests, or even Deep Learning architectures like Convolutional Neural Networks (CNNs) may be the foundation of scanning component 110 and are trained on these features. During training, the dataset may be split into training and validation sets to ensure the scanning component 110 generalizes well to unseen data. Model performance of scanning component 110 may be evaluated using metrics like accuracy, precision, recall, and F1-score, with optimizations made through hyperparameter tuning.

The output of scanning component 110 may be a verdict of whether the script is malicious or non-malicious. If the script is deemed malicious, scanning component 110 may identify the parts of the code that are part of the malicious pattern.

In response to determining that the script is malicious, AST generation component 106 generates an AST of the input script. In some aspects, AST generation component 106 may generate the AST for any file, regardless of whether the pattern is found. The generated AST may be:

```
 1  SourceFile
 2    ExpressionStatement
 3       BinaryExpression
 4                    Identifier       //a
 5                    EqualsToken
 6                    StringLiteral    //"this is clean code1"
 7  ExpressionStatement
 8    BinaryExpression
 9       Identifier
10          EqualsToken
11          StringLiteral   //"evil1"
12  IfStatement
13    Identifier
14      Block
15        ExpressionStatement
16                    CallExpression
17                    Identifier       //eval
18                    BinaryExpression
19                              StringLiteral //"evil2"
20                              PlusToken
21                              Identifier    //b
22    ExpressionStatement
23      BinaryExpression
24         Identifier      //c
25         EqualsToken
26         CallExpression
27                    Identifier       //f
28                    StringLiteral    //"this is clean code2"
29  EndOfFileToken
```

Node selection component 108 may then identify the nodes in which malicious patterns are found. Nodes refer to fundamental units or elements that make up the tree structure. Nodes in an AST correspond to various constructs in the source code, such as expressions, statements, declarations, operators, and more. For example, in a programming language like Python, you might have nodes representing if statements, function definitions, assignments, arithmetic expressions, etc.

ASTs have a hierarchical structure where each node has zero or more child nodes. This structure mirrors the nested nature of code constructs in most programming languages. For instance, a function definition node might have child nodes representing its parameters, body, and possibly return type.

For the input script given above, node selection component 108 may identify the nodes in lines 11 ("StringLiteral") and 17 ("Identifier") as part of the malicious pattern. To avoid syntax errors, the statements from the tree that include the string "Statement" in the name can be removed (e.g., "ExpressionStatement," "IfStatement"). The operators are in lines 7, 12, and 15.

For deletion, remediation component 112 stores the absolute position in the script and the length (e.g., length in bytes) of each AST node.

In the context of programming or scripting languages, the absolute position refers to the precise location or index of a specific element within the script. In some aspects, the absolute position is an offset in bytes from the beginning of a file. In some aspects, the absolute position is a character position, which is an exact index or offset of a character within the script from character 0. For example, the construct associated with the AST node selected by node selection component 108 may start at character 56 in the script.

In some aspects, the length of the a node represents the length of the source code, in bytes, associated with each AST node. For example, the script in line 11 has position 32 (0x20) and the length is 7.

In some aspects, the length of a node refers to the depth of a node. This refers to the distance of a particular node from the root of the AST. It measures how many edges need to be traversed from the root to reach that node. The depth of a node can be used to understand its position within the hierarchical structure of the AST.

In some aspects, the length of the node refers to a size or number of children. In some contexts, length may be given by the number of child nodes directly attached to a particular node. For example, if a node represents an if statement in a programming language, the length of this node would be the number of its child nodes representing conditions, true branch, and possibly the false branch (if it's an if-else statement).

After remediation component 112 removes these operators, the script will be:

a="this is clean code1";
c=f("this is clean code2");

The comments often used by attackers to obfuscate code are also successfully removed using this approach. This ensures the correct removal of malicious code and provides an effective approach against the malicious obfuscation of scripts.

This approach further enhances the precision and effectiveness of script disinfection, reducing the likelihood of false positives and negatives, and ensuring that cleaned scripts remain fully operational.

FIG. 3 illustrates a flow diagram of method 300 for removing a string matching a pattern from a file. At 302, AST generation component 106 parses a file (e.g., script 104) and generates an AST based on the file.

At 304, AST generation component 106 constructs a map of displacements of AST nodes relative to the beginning of the file and their lengths. For example, referring to FIG. 2A, the node ExpressionStatement in line 1 has offset 0 and length 26. The node ExpressionStatement in line 7 has an offset 28 and length 12. The node ExpressionStatement in line 15 has an offset 91 and length 35.

At 306, scanning component 110 searches for patterns of malicious strings in the file (e.g., compares patterns of malicious code 105 against patterns in definitions database 114).

At 308, scanning component 110 determines whether any patterns were found. If no patterns were detected, method 300 ends at 316, where scanning component 110 labels a file as clean. If a pattern is detected, method 300 advances to 310, where node selection component 108 finds the node in the AST that is the parent operator. For example, in the script above, scanning component 110 may determine that the malicious pattern lies in the code:

```
b = "evil1"; //evil comment
if (b) {
    //evil comment
    eval("evil2" + /*evil comment*/ b);
    //evil comment
}
```

In order to ensure that this code can be safely removed, node selection component 108 identifies corresponding nodes in the generated AST. In this case, node selection component 108 may identify the nodes in lines 11 ("String-Literal") and 17 ("Identifier") as part of the malicious pattern in the AST. To avoid syntax errors, the statements from the tree that include the string "Statement" in the name are to be removed (e.g., "ExpressionStatement," "IfStatement"). The operators are in lines 7, 12, and 15. If only "StringLiteral" code is removed, the script will lose functionality due to syntax errors. It should be noted that all parent nodes that can be detected are children of the root SourceFile node.

At 312, node selection component 108 determines the offset and length of the identified AST node (e.g., offset is 28 and length is. At 314, remediation component 112 removes a string from the file based on the offset and length of the identified AST node. Referring to FIG. 2B, the highlighted portion refers to the string to be removed. In some aspects, the string is deleted. In other aspects, the string is turned into a comment.

FIG. 4 illustrates a flow diagram of method 400 for removing malicious code from a script without compromising script functionality. At 402, software remediation module 102 identifies, in a script, at least one string corresponding to a malicious pattern. At 404, software remediation module 102 generates an abstract syntax tree (AST) of the script.

At 406, software remediation module 102 identifies, in the AST, a parent operator associated with the at least one string. For example, the at least one string in the AST is a child node of the parent operator. It should be noted that this is an important step because removing just the at least one string from the script will likely generate a syntax error. This will render the script non-functional. In order to prevent the syntax error, additional code must be removed. For example, removing code comprising the parent operator and the at least one string will not generate the syntax error.

At 408, software remediation module 102 determines an absolute position and length of a node representing the parent operator in the AST. In some aspects, absolute position is relative to a root node of the AST and the length of the node represents an amount of child nodes of the node.

At 410, software remediation module 102 removes malicious code from the script based on the absolute position and length of the node. Software remediation module 102 may perform this removal by simply deleting the corresponding text. In some aspects, the parent operator comprises at least one child operator, and wherein removing the malicious code comprises removing code associated with the at least one child operator.

In some aspects, software remediation module 102 may perform the removal by generating a modified AST by removing the node based on the absolute position and the length of the node. Software remediation module 102 may then reconstruct the script using the modified AST, wherein the reconstructed script does not include the malicious code. The original script may then be deleted altogether with the reconstructed script stored in its place.

In some aspects, software remediation module 102 may further remove comments in the script that are used to obfuscate code.

In some aspects, software remediation module 102 may remove other parts of the script. For example, the parent operator may be a first parent operator. Software remediation module 102 may identify, in the AST, a second parent operator associated with the at least one string or another malicious string. Software remediation module 102 may then determine another absolute position and length of another node representing the second parent operator in the AST, and may remove the additional malicious code from the script based on the another absolute position and length of the another node.

Figure 5:
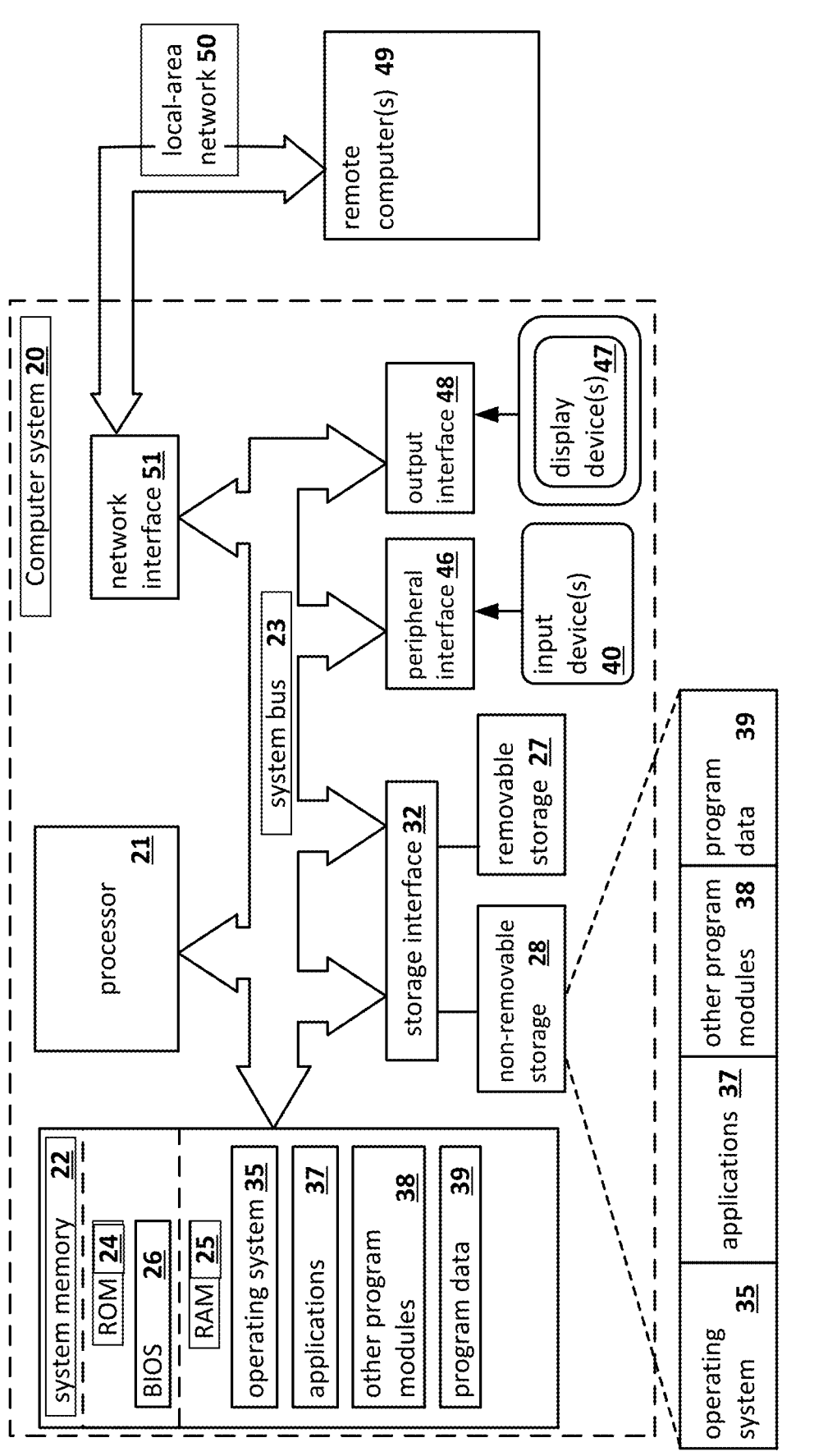
FIG. 5 presents an example of a general-purpose computer system on which aspects of the present disclosure can be implemented.

FIG. 5 is a block diagram illustrating a computer system 20 on which aspects of systems and methods for removing malicious code from a script without compromising script functionality may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for removing malicious code from a script without compromising script functionality, the method comprising:
identifying, in a script, at least one string corresponding to a malicious pattern;
generating an abstract syntax tree (AST) of the script;
identifying, in the AST, a parent operator associated with the at least one string;
determining an absolute position and length of a node representing the parent operator and at least one child operator in the AST;
removing malicious code from the script without generating syntax errors, including: generating a modified AST by removing the node, wherein removing the node includes removing code associated with the node based on the absolute position and the length of the node, wherein removing the at least one string from the script generates a syntax error and removing the code comprising parent operator and the at least one string does not generate the syntax error; and
reconstructing the script without the malicious code using the modified AST.

2. The method of claim 1, wherein the at least one string in the AST is a child node of the parent operator.

3. The method of claim 1, removing comments in the script that are used to obfuscate code.

4. The method of claim 1, wherein the parent operator is a first parent operator, further comprising:
identifying, in the AST, a second parent operator associated with the at least one string;
determining another absolute position and length of another node representing the second parent operator in the AST; and
removing additional malicious code from the script based on the another absolute position and length of the another node.

5. The method of claim 1, wherein the absolute position is an amount of bytes from the beginning of a file and the length of the node represents an amount of bytes of source code associated with the node.

6. The method of claim 1, wherein the parent operator comprises at least one child operator, and wherein removing the malicious code comprises removing code associated with the at least one child operator.

7. The method of claim 1, wherein identifying, in the AST, the parent operator associated with the at least one string comprises determining that the parent operator is a statement from the tree that includes the string "Statement" in the name.

8. The method of claim 1, wherein identifying the at least one string corresponding to the malicious pattern comprises:
transforming the script into a structured representation that captures lexical, syntactic, and statistical characteristics,
extracting features comprising code complexity metrics, and
classifying the script using a supervised learning model trained on the features.

9. A system for removing malicious code from a script without compromising script functionality, comprising:
at least one memory;
at least one hardware processor coupled with the at least one memory and configured, individually or in combination, to:
identify, in a script, at least one string corresponding to a malicious pattern;
generate an abstract syntax tree (AST) of the script;
identify, in the AST, a parent operator associated with the at least one string;
determine an absolute position and length of a node representing the parent operator and at least one child operator in the AST;
remove malicious code from the script without generating syntax errors, including: generating a modified AST by removing the node, wherein removing the node includes removing code associated with the node based on the absolute position and the length of the node, wherein removing the at least one string from the script generates a syntax error and removing the code comprising parent operator and the at least one string does not generate the syntax error; and
reconstruct the script without the malicious code using the modified AST.

10. The system of claim 9, wherein the at least one string in the AST is a child node of the parent operator.

11. The system of claim 9, wherein the at least one hardware processor is further configured to remove comments in the script that are used to obfuscate code.

12. The system of claim 9, wherein the parent operator is a first parent operator, wherein the at least one hardware processor is further configured to:
identify, in the AST, a second parent operator associated with the at least one string;
determine another absolute position and length of another node representing the second parent operator in the AST; and
remove additional malicious code from the script based on the another absolute position and length of the another node.

13. The system of claim 9, wherein the absolute position is an amount of bytes from the beginning of a file and the length of the node represents an amount of bytes of source code associated with the node.

14. The system of claim 9, wherein the parent operator comprises at least one child operator, and wherein removing the malicious code comprises removing code associated with the at least one child operator.

15. The system of claim 9, wherein identifying, in the AST, the parent operator associated with the at least one string comprises determining that the parent operator is a statement from the tree that includes the string "Statement" in the name.

16. The system of claim 9, wherein identifying the at least one string corresponding to the malicious pattern comprises:

transforming the script into a structured representation that captures lexical, syntactic, and statistical characteristics, extracting features comprising code complexity metrics, and classifying the script using a supervised learning model trained on the features.

17. A non-transitory computer readable medium storing thereon computer executable instructions for removing malicious code from a script without compromising script functionality, including instructions for:

identifying, in a script, at least one string corresponding to a malicious pattern;

generating an abstract syntax tree (AST) of the script;

identifying, in the AST, a parent operator associated with the at least one string;

determining an absolute position and length of a node representing the parent operator and at least one child operator in the AST;

removing malicious code from the script without generating syntax errors, including: generating a modified AST by removing the node, wherein removing the node includes removing code associated with the node based on the absolute position and the length of the node, wherein removing the at least one string from the script generates a syntax error and removing the code comprising parent operator and the at least one string does not generate the syntax error; and reconstructing the script without the malicious code using the modified AST.

18. The non-transitory computer readable medium of claim 17, wherein identifying, in the AST, the parent operator associated with the at least one string comprises determining that the parent operator is a statement from the tree that includes the string "Statement" in the name.

19. The non-transitory computer readable medium of claim 17, wherein identifying the at least one string corresponding to the malicious pattern comprises:

transforming the script into a structured representation that captures lexical, syntactic, and statistical characteristics, extracting features comprising code complexity metrics, and classifying the script using a supervised learning model trained on the features.

* * * * *